(12) United States Patent
Jenter

(10) Patent No.: US 12,253,400 B2
(45) Date of Patent: Mar. 18, 2025

(54) FLOW METERING SYSTEM

(71) Applicant: BEPIS, Inc., Northville, MI (US)

(72) Inventor: Jesse Jenter, Northville, MI (US)

(73) Assignee: BEPIS, INC., Northville, MI (US)

(*) Notice: Subject to any disclaimer, the term of this patent is extended or adjusted under 35 U.S.C. 154(b) by 313 days.

(21) Appl. No.: 17/682,938

(22) Filed: Feb. 28, 2022

(65) Prior Publication Data

US 2022/0276083 A1    Sep. 1, 2022

Related U.S. Application Data (60) Provisional application No. 63/154,076, filed on Feb. 26, 2021.

(51) Int. Cl.
*G01F 1/696* (2006.01)
*G01F 15/063* (2022.01)

(52) U.S. Cl.
CPC ............ *G01F 15/063* (2013.01); *G01F 1/696* (2013.01)

(58) Field of Classification Search
CPC ...... G01F 15/063; G01F 15/024; G01F 1/696; G01F 1/74; G01F 1/8436; G01F 1/667; G01F 1/8431; G01F 25/0092; G01F 25/10; G01F 7/00; G01F 23/14; G05B 19/41875; G05B 23/024
USPC ........ 73/861.356, 861, 1.16, 861.03, 861.28, 73/168, 1.36, 861.42, 1.35; 222/1; 340/606, 870.02, 605, 618, 613, 626, 340/286.01, 611, 603; 700/282, 108, 1, 700/28, 90; 702/127, 45, 19, 100, 50, (Continued)

(56) References Cited

U.S. PATENT DOCUMENTS

| 4,921,134 | A  |         | 5/1990 | Aschberger et al. |
|-----------|----|---------|--------|----------------------|
| 6,212,959 | B1 | *       | 4/2001 | Perkins .................... G01F 1/115 |
|           |    |         |        | 73/861.74 |
| 8,833,405 | B2 |         | 9/2014 | Phallen et al. |

(Continued)

FOREIGN PATENT DOCUMENTS

| CA | 2846380 A1 * | 3/2013  | .............. A61M 1/16 |
| EP | 1971903 B1   | 10/2020 | |

OTHER PUBLICATIONS

PCT International Search Report & Written Opinion dated May 18, 2022, Application No. PCT/US22/18175.

(Continued)

*Primary Examiner* — Jeffrey P Aiello
(74) *Attorney, Agent, or Firm* — The Dobrusin Law Firm, PC (57) ABSTRACT

A flow metering system is generally presented herein. The flow metering system is generally configured to measure liquid flow from a liquid dispensing system and to track volume change and other measurable characteristics of the liquid in real time. The flow metering system may include a flow sensor. The flow sensor may be positioned in line with a liquid flow line, or in a separate line where the remainder of the liquid exits via a bypass, where the liquid flow line is connected to and configured to dispense liquid from a pre-packaged liquid volume, or a reservoir. For example, the flow sensor may be connected in-line to a beer line, such as vinyl piping, for a beer keg or soda dispensing tank. However, it will be appreciated that the flow metering system may be used with any type of liquid dispensing system.

9 Claims, 7 Drawing Sheets

(58) Field of Classification Search
USPC ....... 702/182, 183, 47, 188, 189, 61, 51, 62, 702/12, 130, 55, 24, 34, 85, 138, 98
See application file for complete search history.

(56) References Cited

U.S. PATENT DOCUMENTS

| | | | | |
|---|---|---|---|---|
| 9,521,922 | B2* | 12/2016 | Deo | A47J 31/40 |
| 10,482,743 | B2* | 11/2019 | Li | H04L 12/2818 |
| 10,689,242 | B2* | 6/2020 | Keating | B67D 3/0003 |
| 2013/0061760 | A1* | 3/2013 | Cahen | A47J 31/4403 |
| | | | | 99/280 |
| 2018/0265344 | A1* | 9/2018 | Keating | B67D 3/0051 |
| 2018/0321072 | A1* | 11/2018 | Williams | B65D 51/24 |

OTHER PUBLICATIONS

European Extended Search Report dated Dec. 20, 2024, Application No. 22760575.5.

* cited by examiner

FLOW METERING SYSTEM

CROSS REFERENCE TO RELATED APPLICATIONS

This application claims priority and benefit to Provisional Patent Application Ser. No. 63/154,076 filed on Feb. 26, 2021.

FIELD OF INVENTION

The field of invention relates generally to a system and method for measuring and tracking the flow of liquid from a contained volume source.

BACKGROUND

Beverage dispensing systems, such as beer taps, fountain soda machines, and the like, commonly dispense beverages at a remote location from a liquid volume. For example, beer kegs or soda syrup bags and CO2 tanks may be stored in a cold storage location remote from restaurant equipment and dispensing stations. Commonly, the dispensing stations are connected to the remote storage by flow lines that transport the beverage from the storage location to the tap. However, the remote configuration makes it difficult to monitor conditions of the system in real time.

Some solutions have been developed for monitoring the remaining volume of beverage storage. Often times these systems rely on sensors, such as keg sensors, to monitor current volume within a keg or other beverage storage receptacle. However, these systems require the sensors to be physically and sometimes electronically reset any time the storage receptacle is changed. Further, they fail to provide any feedback on the condition of beverages within the line, between the storage location and the dispensing station. Other systems that provide additional feedback utilize complex setups and fail to provide easily configurable and usable feedback to system users.

For at least these reasons, an improved flow metering system and method are needed.

SUMMARY

A flow metering system is generally presented herein. The flow metering system is generally configured to measure liquid flow from a liquid dispensing system and to track volume change and other measurable characteristics of the liquid in real time. The flow metering system may include a flow sensor. The flow sensor may be positioned in line with a liquid flow line, or in a separate line where the remainder of the liquid exits via a bypass, where the liquid flow line is connected to and configured to dispense liquid from a pre-packaged liquid volume, or a reservoir. For example, the flow sensor may be connected in-line to a beer line, such as vinyl piping, for a beer keg or soda dispensing tank. However, it will be appreciated that the flow metering system may be used with any type of liquid dispensing system.

A flow metering system for a fluid dispensing apparatus, the flow metering system operated by a user, the flow metering system having a reservoir and an exit line, the flow metering system having a flow sensor positioned in the exit passage configured to allow fluid to pass through the flow sensor, the flow sensor configured to measure a volume of fluid exiting the reservoir through the exit line, and a control module in communication with the flow sensor, the control module configured to accept a user inputter top-level and a user inputted bottom-level, total volume calculated by the control module as the difference between the user inputter top-level and the user inputted bottom-level, the control module configured to calculate changes in volume in the reservoir using amount of fluid measured by the flow sensor, wherein if the amount of fluid measured by the flow sensor approaches the user inputted bottom-level, notification is communicated.

In some embodiments, the control module includes a display screen displaying information regarding the flow metering system. The display may include a backlight with at least one backlight colors. The backlight color may change based on preset thresholds to provide a simple indicator to the user.

In some embodiments, the control module is configured to communicate wirelessly. A temperature sensor may be provided, the temperature sensor in communication with the control module. A line splitter may be provided in line with the exit line, the line splitter positioned upstream of the flow sensor, the line splitter configured to route some liquid to the flow sensor and the remainder out so as to improve efficiency of the system.

In some embodiments, the notification is displayed to the user. In other embodiments, the notification is audibly communicated to the user. In some embodiments, if the temperature sensor measures a temperature above or below a predetermined threshold, notification is communicated to the user.

BRIEF DESCRIPTION OF THE DRAWINGS

The operation of the invention may be better understood by reference to the detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

With reference to FIGS. 1-8, a flow metering system 10 is generally presented. The flow metering system is generally configured to measure liquid flow from a liquid dispensing system and to track volume change and other measurable characteristics of the liquid in real time.

The flow metering system 10 may include a flow sensor 12. The flow sensor 12 may be positioned in line with a liquid flow line 14 and connected thereto via various connectors 13, where the liquid flow line 14 is connected to and configured to dispense liquid from a pre-packaged liquid volume, or a reservoir. For example, the flow sensor 12 may be connected in-line to a beer line, such as vinyl piping, for a beer keg or soda dispensing tank 32. However, it will be appreciated that the flow metering system 10 may be used with any type of liquid dispensing system.

The flow sensor 12 may be specifically configured to minimize any flow restrictions through the flow line 14. For example, the flow sensor 12 may be configured to not include any paddle wheel or other structure that would impede the flow of liquid through the sensor or flow line 14. However, it will be appreciated that any appropriate flow sensor 12 may be used.

The flow sensor 12 may additionally be configured to measure temperature of a liquid in the flow line 14. For example, the flow sensor 12 may include a thermopile or thermocouple to measure the temperature of the liquid at the point of contact with the flow line 14. The temperature measurement may allow real time monitoring of liquid temperatures at the sensor location, as described in further detail below. It will be appreciated that in some embodiments, more than one flow sensors 12 may optionally be place on a single flow line to monitor the temperature and flow at numerous points along the line 14. The flow sensor, or another separate sensor connected to the system, may also measure pressure. The pressure reading may be communicated to the user or used and compared with optimal settings of the system.

The flow metering system 10 may include a controller module 16. The controller module 16 may integrate a microcontroller, display unit 18, and user input buttons 20 into a single unit. It will be appreciated that in some embodiments the microcontroller, display unit 18, and or user inputs 20 may be separated out from the controller module 16. The display unit 18 may comprise an LCD screen or other screen capable of displaying system information, such as alpha numeric characters. The user inputs 20 may comprise one or more buttons, knobs, or the like. The inputs 20 may be used to input or select various system values, as described in further detail below. The flow sensor 12 connects to the controller 16 by means of a data transfer cable 42. It should be appreciated that in other embodiments, data is transmitted to from the sensor 12 to the controller 16 wirelessly. A power cable 40 may also be provided to power the controller 16.

Figure 1:
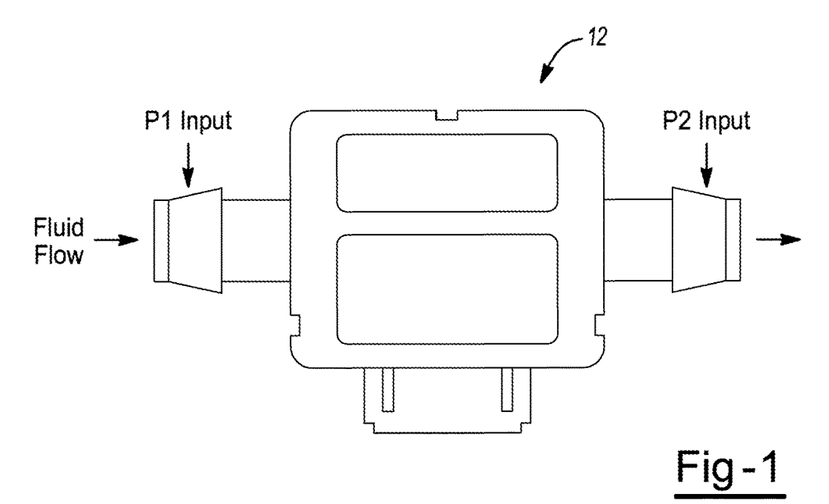
FIG. 1 illustrates a front view of a flow sensor of a flow metering system according to one or more embodiments shown and/or described herein.
Figure 2:
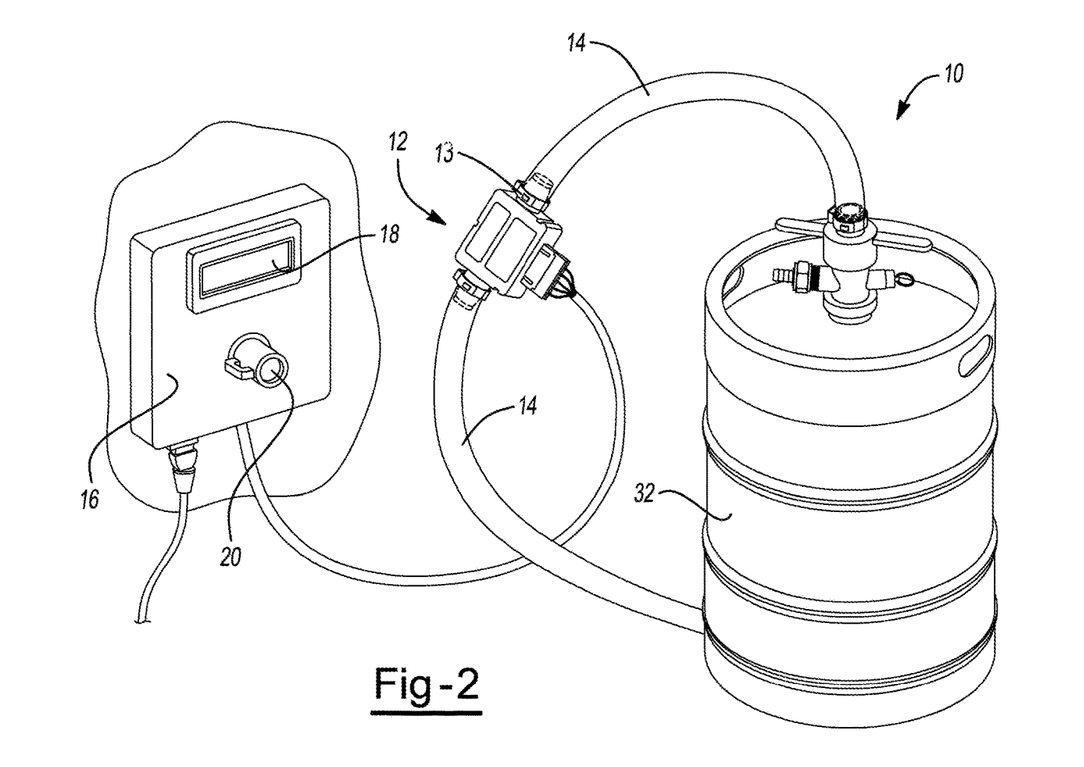
FIG. 2 illustrates a perspective view of the flow metering system connected to a reservoir holding a fluid system according to one or more embodiments shown and/or described herein.
Figure 3:
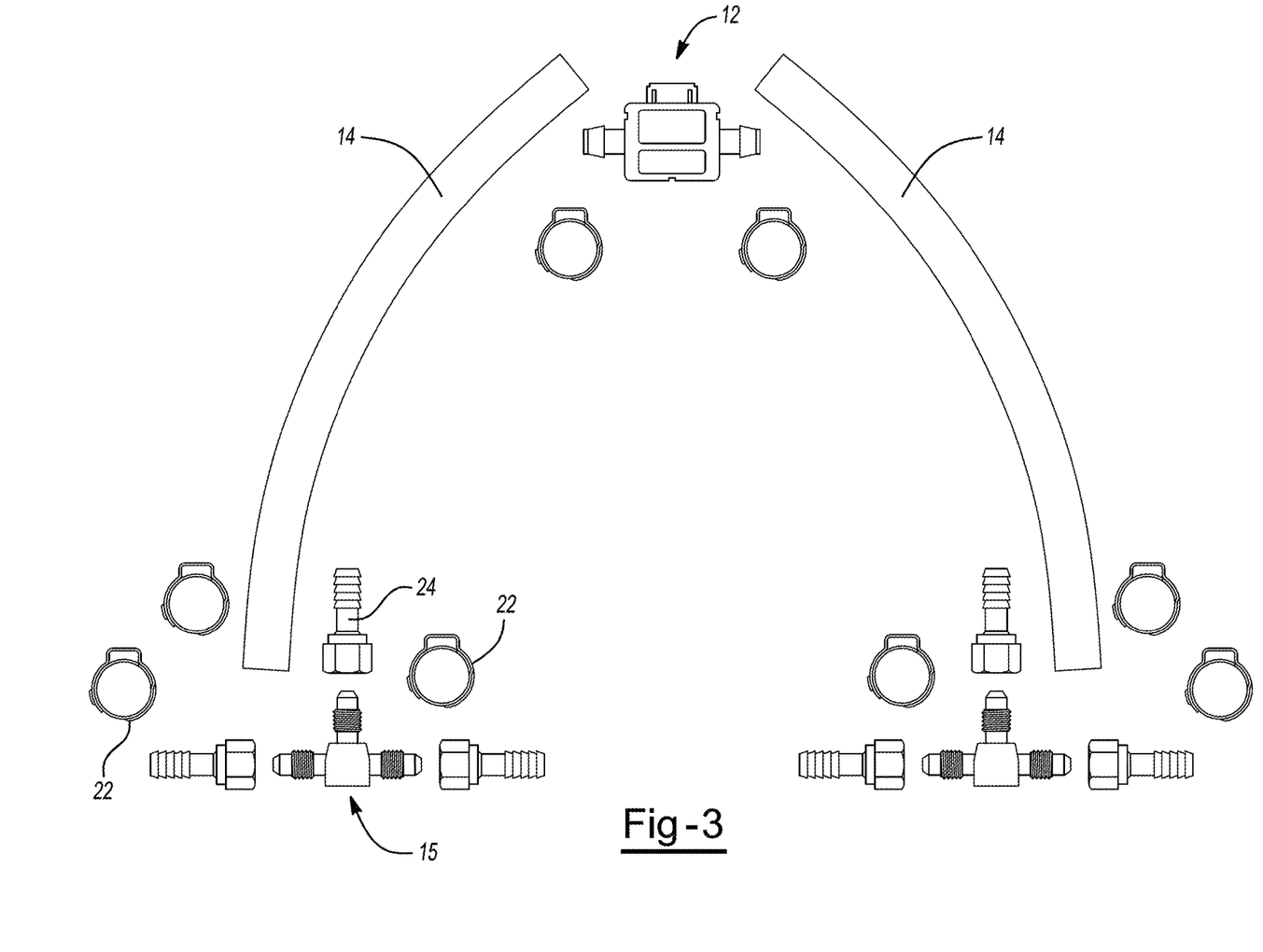
FIG. 3 illustrates an exploded top view of one embodiments of the flow sensor, fluid line, and connecting components system according to one or more embodiments shown and/or described herein.
Figure 4:
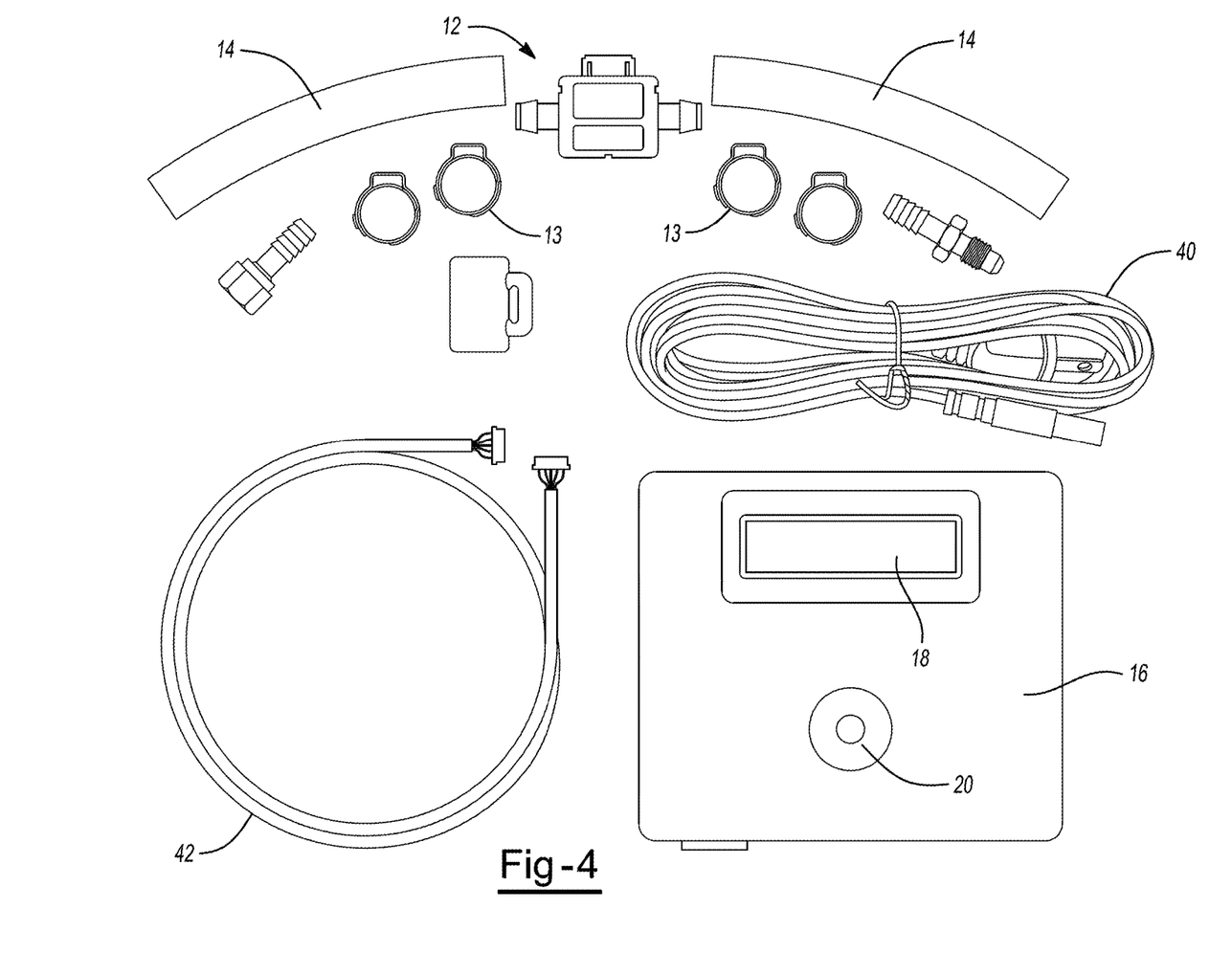
FIG. 4 illustrates an exploded top view of the flow metering system according to one or more embodiments shown and/or described herein.
Figure 5:
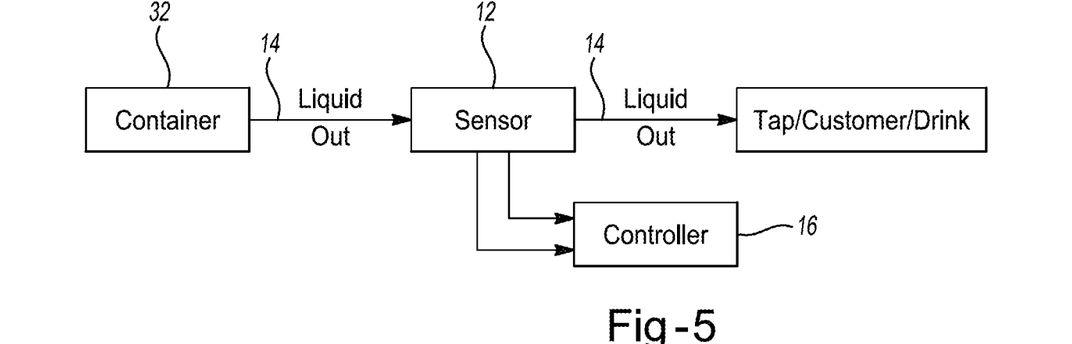
FIG. 5 illustrates a flow chart of one embodiment of the fluid flow out of a container/reservoir through the sensor, where data is transferred to the controller, and liquid then dispensed out system according to one or more embodiments shown and/or described herein.

In one embodiment as shown in FIG. 3, the components connecting the flow sensor 12 are depicted including various connection members including a splitter 15 and connectors 22, 24.

The controller module 16 may be configured to connect to peripheral networks and devices. For example, the controller module may include a Wi-Fi, Bluetooth, or other remote or hard wired network connections to enable direct communication with portable and smart devices as well as network/internet connection. The connectivity may allow for output from the controller module 16 to peripheral devices as well as receiving input from such devices.

The controller module 16 may provide power to and receive data from the flow sensors 12 to track real time changes in flow and temperature at each sensor 12. The controller module 16 may use the flow information to calculate changes in system volume. For example, the system may be initiated with a preset volume, such as a preset volume that is equivalent to known beer keg volumes. The volume may be calculated by the controller module as the difference between a top volume level and a bottom volume level. The top and bottom volume levels may be adjusted by a user using the user inputs 20 to adjust the beginning or initial volume of fluid in storage (e.g., how much beer is contained in a keg). In some instances, the bottom level may be set at zero (or any number just above zero) to represent the bottom of the keg or liquid receptacle. By adjusting the top level value, a user may adjust the total anticipated volume or initial volume of liquid in the system 10. To track volume levels, the total volume may be reduced as flow is measured through any sensor 12 on a line 14 connected to the system 10.

The flow metering system 10 may be configured to provide real time feedback information to the user. For example, the display unit 18 may display total volume of liquid within the system in real time. The display unit 18 may be positioned at any optimal location, such as near a beer tap or soda dispensing outlet, to allow users or employees to monitor system volumes in real time.

The display unit 18 may be configured to provide real time feedback on temperatures and flow rates within the system 10 related to preset thresholds. For example, the controller module 16 may be preprogrammed with preset thresholds for low and high flow rates and low and high liquid temperatures. The thresholds may be preset to match the intended use of the system 10. For example, a system intended for beer/keg dispensing have liquid temperature thresholds set to the upper and lower generally accepted temperatures for beer. In an embodiment, the thresholds may be amended or changed by a user using the user inputs 20.

The display unit 18 may include a backlight feature with one or more backlight colorings. In an embodiment, the display unit 18 may change the backlight to a first color (such as blue) when a temperature or flow rate drops below a preset low-end threshold. The backlight may remain lit in the first color until the temperature or flow rate returns above the threshold. Likewise, the display unit 18 may change the backlight to a second color (such as red) when the temperature or flow rate rises above a preset high-end threshold. The backlight may remain lit in the second color until the temperature or flow rate drops back under the high-end threshold. It will be appreciated that the display unit 18 may further include a third backlight color, such as green, that may be lit when no upper or lower thresholds of flow rate or temperature are crossed.

In an instance when one of the flow rate and temperature is over the high-end threshold, and the other of the temperature and flow rate is below the low-end threshold, the display unit 18 may light the backlight to either the first or second color. The instructions or user guide for the display unit may clarify which color is lit in a condition where one parameter is high and the other is low to alert the user of that possibility. The display unit 18 may display information regarding the parameter that is over or under the preset threshold.

In an embodiment, the controller module 16 may be configured to be locked out to prevent tampering or unwanted/unauthorized changes. The controller module 16 may be preprogrammed with a preset code that is required to be entered before any presets or user input values may be changed. The user may enter the code using buttons and knobs related to the user inputs 20.

In use, the flow metering system 10 may be configured to track real time volume and temperature changes in a liquid dispensing system. At least one sensor 12 may be placed at a desired location on a flow line 14 connected to a liquid volume, such as a beer keg. The controller module 16 may be preset or set by a user to initialize a volume matching the volume of the liquid volume. The volume of the keg or liquid volume may be displayed on the display unit 18 at a position remote from the keg or liquid volume. As liquid passes through the flow sensor 12, the volume amount displayed may be reduced to show current volume of the keg in real time. The display unit may further optionally display temperature readings from the flow sensor 12 and provide warning lights for any flow rates or temperatures that are over or under predetermined or preset thresholds.

Figure 6:
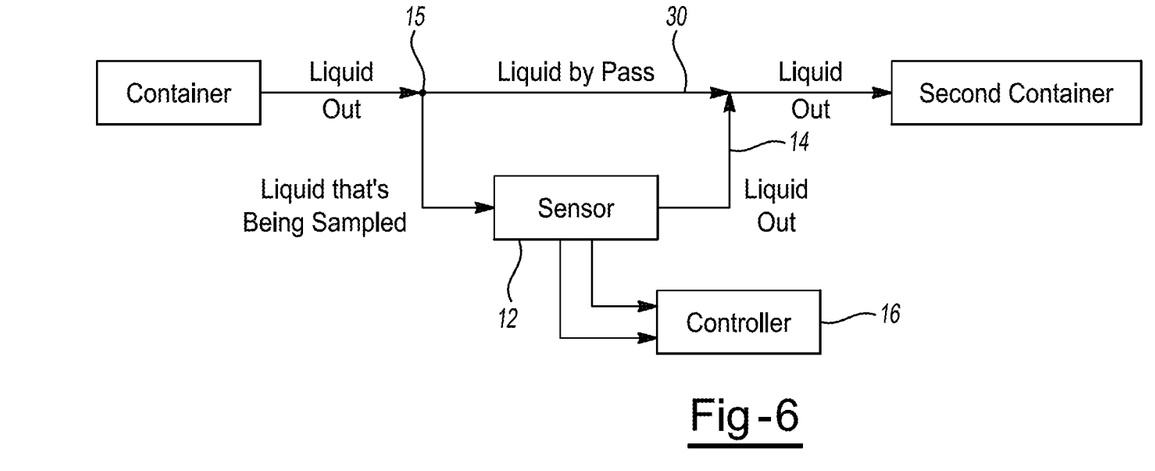
FIG. 6 illustrates a flow chart of an alternative embodiment of the fluid flow out of a container/reservoir through the sensor, using a liquid by-pass, where data is transferred to the controller from the sensor, and liquid then dispensed out system according to one or more embodiments shown and/or described herein.
Figure 7A:
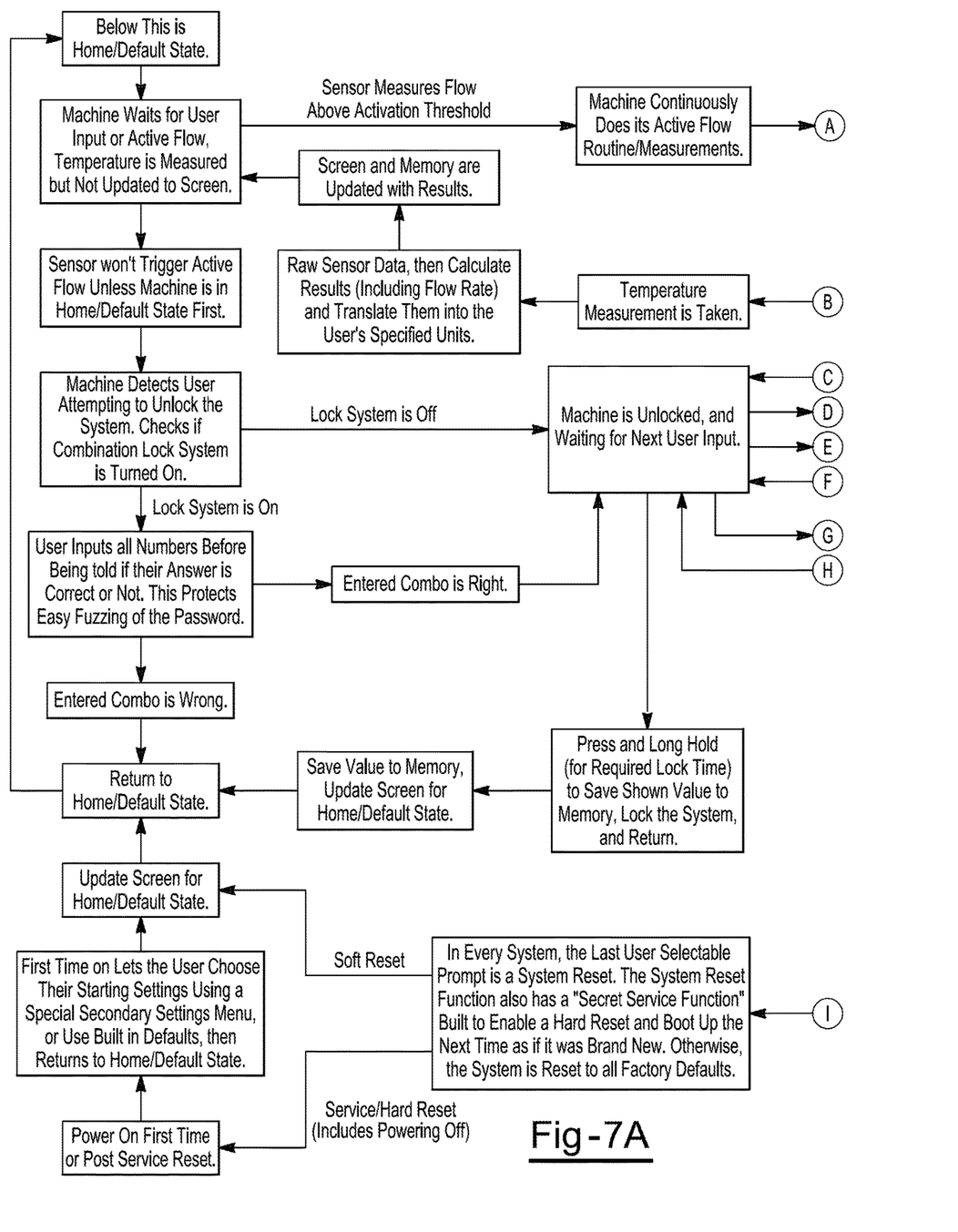
FIG. 7A illustrates a first section of a flow chart illustrating the detailed series of steps taken by the controller when in communication with the flow sensor (wireless or wired) according to one or more embodiments shown and/or described herein.
Figure 7B:
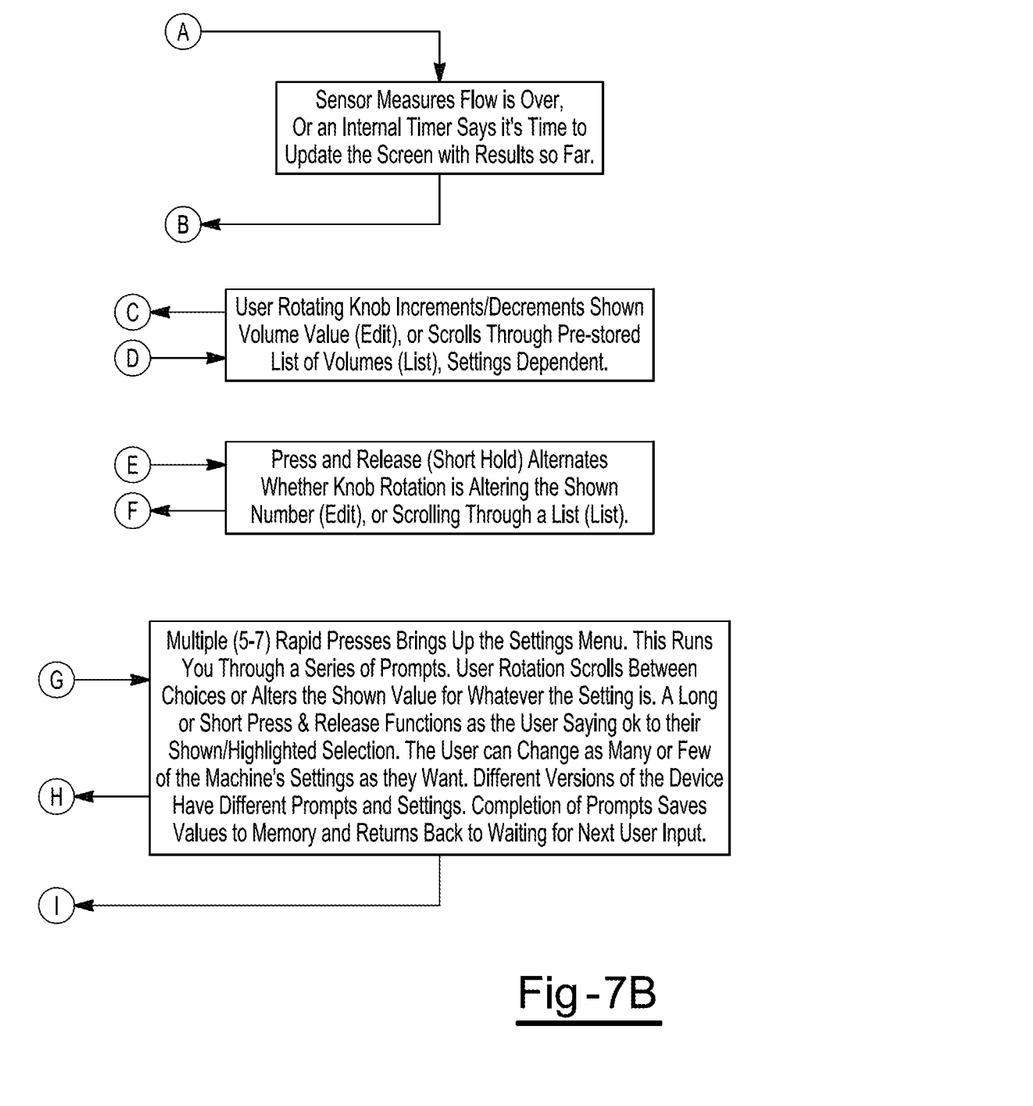
FIG. 7B illustrates a second section (to be read in combination with FIG. 7A) of a flow chart illustrating the detailed series of steps taken by the controller when in communication with the flow sensor (wireless or wired) according to one or more embodiments shown and/or described herein.
Figure 8:
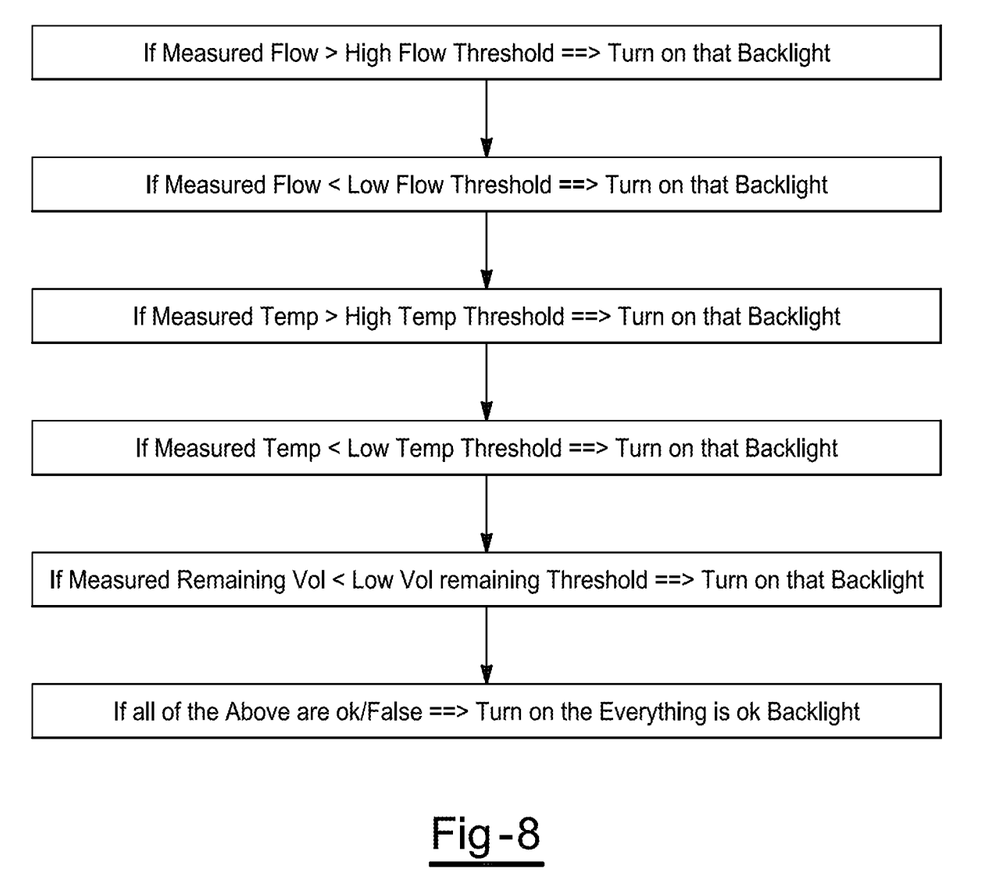
FIG. 8 illustrates a flow chart illustrating the backlighting conditionals, or the series of steps and commands the controller takes to control the backlight feature of the display of the controller according to one or more embodiments shown and described herein.

In an alternative embodiment as illustrated in FIG. 6, a bypass 30 is provided to gather data on only a sample of the liquid exiting the reservoir.

The on-unit knob rotates and is pressable. Rotation is used to move between choices, or to alter a number. Knob presses are used to select/accept what is displayed on screen, to change modes, and to lock/unlock the system. The system and method as described herein is beneficial in that it can cut down on guesswork both when a container is about to go empty, and if minimum volume exchange has occurred through a line (for cleaning purposes). The system can also be used to detect and avoid possible less-than-ideal temperatures or flow rates.

To use, the user manipulates the system and display 18 using the on-unit knob 20. Rotation is used to move between choices, or to alter a number. Knob presses are used to select/accept what is displayed on screen, to change modes, and to lock/unlock the system.

At a first step, the device will be locked and is waiting for either 1) active flow through the line; or 2) a use to unlock for changes. The user unlocks the device by pressing and holding the knob for approximately 5 seconds. The device will now be unlocked and in volume edit mode, waiting for the user to either 1) rotate the knob to alter the volume remaining; 2) Press the knob to change the volume list mode; 3) Press the knob six times to quickly change to Settings Mode; or 4) press and hold it up toive seconds to lock the device and save the number on the screen. The user may press the knob to change to List Mode, then rotate the knob to see different preloaded common container sizes. Once the user sees the desired container size, the user may then press the knob again to select and switch back to Edit Mode with that number. Rotate the knob to try altering the shown volume remaining. The user may then try pressing the knob 6 times quickly. The device will change to Settings Mode. The user may also change any of the settings while here, as Settings Mode will run through all the system's possible settings/prompts, and then save the changes at the end. If the user wishes to reset the system to its default state, the last choice in Settings Mode allows you to do this. Just follow the on-screen prompts. Once the user completed the settings change, the device will display a screen saying, "Press to Exit". Press the button here, and you will change back to Edit Mode. The device will now be unlocked and in Edit Mode, waiting for the user again. Press and hold the knob for 5 seconds to lock the device and save the number shown.

The controller processes everything in real-time with no outside connection. However, in other embodiments, the controller and/or flow sensor may be connected to an auxiliary processor or computer via wireless communication such as WiFi, Bluetooth . . . etc. to communicate real-time information and to allow the user to manipulate the controller, to receive information, and/or to change settings.

Additional sensors (temperature, pressure . . . etc.) or added connectivity options (Bluetooth, WiFi) are also available. This is accomplished by adding in or swapping in a different processor, and new/different sensors will also be placed in the main housing. In these cases, this additional (or substitute) data is pushed so that is to be saved to memory to the cloud at the same time.

The system further provides for "at-a-distance" color feedback whereby the screen's color is indicative of the status of the system. Any user canan look to the screens color to quickly see if the system is within the preset boundaries and if the container is about to run out. Further, the screens numerical output to see exactly how things are running and to do basic problem solving. If the line is having problems or if the user wishes to tweak things to optimize performance and results.

The system as described herein operates under various settings such as enumerated below.

Volume Remaining: A number setting to start the countdown of volume the container has left inside until empty.

Low Volume Warning: A number setting that triggers the screen to notify when the line's container/volume is close to running out.

Volume Units: A choice between oz, gal, L, and us bbl.

Low/High Temperature thresholds: A number setting that triggers the screen to notify when the line's temperature is being measured as lower/higher than the wanted range.

Temperature units: A choice between degrees F. and C.

Low/High Flow thresholds: A number setting that triggers the screen to notify when the line's flow rate is being measured as lower/higher than the wanted range.

Flow units: A choice between oz/s, gal/min, and L/min.

Pipe Size: A number setting that describes the internal diameter of the line that is teed in parallel with the sensor line.

Pipe Units: A choice between mm and in.

Security: A choice between turning a combination lock on/off for extra locking protection. The numbers for the combination lock are chosen each time you turn the setting on. Once on, the device will not unlock until the correct combination is entered.

Reset: The system will reset to default, and this will erase any currently held settings. A secondary prompt will ask if the user is sure, to avoid unwanted resets.

Regarding FIG. 9, some of the conditions share the same backlight color currently, in an attempt to keep it simple for users. The only light that is not shared is the everything is ok color. The system runs through this checklist every time the screen is updated, thus tying the screen's color to system health. The threshold values that help determine which backlight color is on are what is changed by the settings prompts. The user can make the backlight only trigger for one set of conditionals (i.e. only temps, only flows, only vol) by setting different threshold values at their extremes, therefore effectively turning them off.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

It is noted that the terms "substantially" and "about" may be utilized herein to represent the inherent degree of uncertainty that may be attributed to any quantitative comparison, value, measurement, or other representation.

These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consist of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination.

It is therefore intended that the appended claims (and/or any future claims filed in any Utility application) cover all such changes and modifications that are within the scope of the claimed subject matter.

Moreover, although various aspects of the claimed subject matter have been described herein, such aspects need not be utilized in combination.

It is therefore intended that the appended claims cover all such changes and modifications that are within the scope of the claimed subject matter.

Having thus described the invention, We claim:

1. A flow metering system for a fluid dispensing apparatus, the flow metering system operated by a user, the flow metering system having a reservoir and an exit line, the flow metering system comprising:
   a flow sensor positioned in an exit passage configured to allow fluid to pass through the flow sensor, the flow sensor configured to measure a volume of fluid exiting the reservoir through the exit line; and
   a control module in communication with the flow sensor, the control module configured to accept a user inputter top-level and a user inputted bottom-level, total volume calculated by the control module as the difference between the user inputter top-level and the user inputted bottom-level,
   the control module configured to calculate changes in volume in the reservoir using amount of fluid measured by the flow sensor;

wherein if the amount of fluid measured by the flow sensor approaches the user inputted bottom-level, notification is communicated, wherein a line splitter is provided in line with the exit line, the line splitter positioned upstream of the flow sensor, the line splitter configured to route some liquid to the flow sensor and the remainder out so as to improve efficiency of the system.

2. The flow metering system of claim 1 wherein the control module includes a display screen displaying information regarding the flow metering system.

3. The flow metering system of claim 2 wherein the display includes a backlight with at least one backlight colors.

4. The flow metering system of claim 3 wherein the backlight color changes based on preset thresholds to provide a simple indicator to the user.

5. The flow metering system of claim 1 wherein the control module is configured to communicate wirelessly.

6. The flow metering system of claim 1 further including a temperature sensor, the temperature sensor in communication with the control module.

7. The flow metering system of claim 1 wherein the notification is displayed to the user.

8. The flow metering system of claim 1 wherein the notification is audibly communicated to the user.

9. The flow metering system of claim 6 wherein if the temperature sensor measures a temperature above or below a predetermined threshold, notification is communicated to the user.

* * * * *